Figure 1:
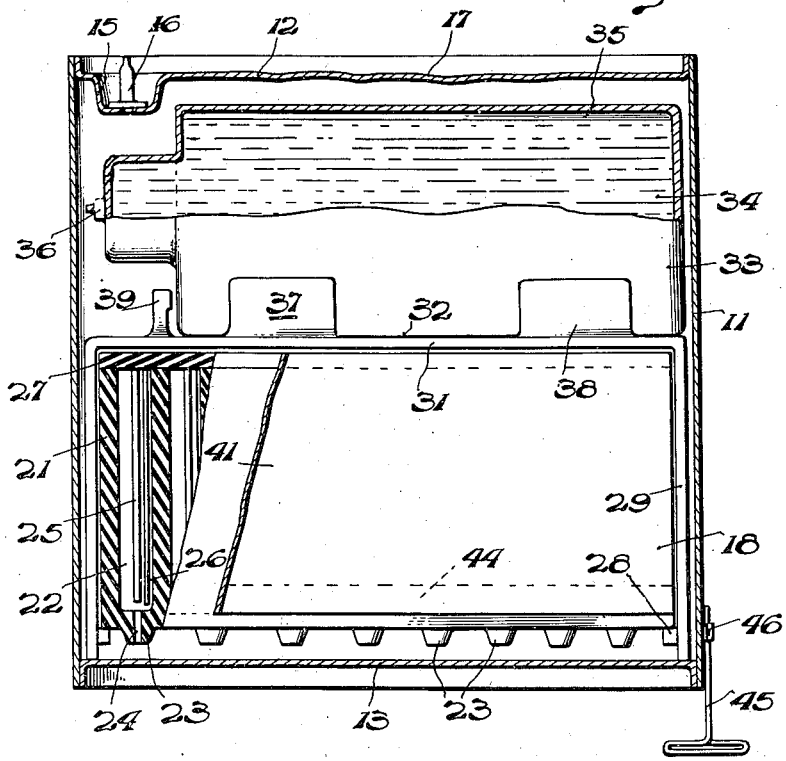

Oct. 26, 1948.  V. D. HAUCK  2,452,049
COMBINED PACKAGE AND FILLING DEVICE
FOR BATTERIES OR HOLLOW BODIES
Filed Feb. 16, 1945

INVENTOR
Vernon D. Hauck
BY
Roy D. Bateman
ATTORNEY

Patented Oct. 26, 1948

2,452,049

UNITED STATES PATENT OFFICE 2,452,049

COMBINED PACKAGE AND FILLING DEVICE FOR BATTERIES OR HOLLOW BODIES

Vernon D. Hauck, Towson, Md., assignor to Bendix Aviation Corporation, South Bend, Ind., a corporation of Delaware Application February 16, 1945, Serial No. 578,159

10 Claims. (Cl. 226—19)

The present invention relates to methods of an apparatus for filling storage batteries and the like, and is more particularly concerned with the filling of miniature multiple-cell batteries of the character in which the cells are completely sealed, except for a series of small capillary openings, through which an electrolyte is introduced just prior to use, although the invention is not limited to such use and may be successfully employed for filling other hollow bodies.

In using batteries of this character it is customary to ship the batteries and the electrolyte separately, and to store them in that condition, deferring filling of the battery until just prior to use, inasmuch as it has been found that such batteries deteriorate when stored charged with electrolyte.

In the copending application of Louvan E. Wood, Serial No. 577,490, filed February 12, 1945, for "Method of and apparatus for filling batteries or the like" there is disclosed a pump assembly which has proven very satisfactory for filling batteries in the field. The present invention deals with a novel method and apparatus which may be employed to fill batteries in the field, and is particularly advantageous where the volume of batteries used by the customer is insufficient to justify purchase of a pump, and also possesses the additional advantage of incorporating the battery and its electrolyte in a unitary package which may be fabricated and sealed at the factory, and shipped and maintained in sealed condition up to the time the battery is ready for use.

It is accordingly the major object of this invention to provide a novel method of an apparatus for filling batteries or the like, which may be prepared as a sealed package embodying both the battery and its electrolyte in separate containers, and which may be readily placed in operative condition at the time and place of use by inexperienced help, and without the need for vacuum pumps or any other apparatus.

A further important object is to provide a novel battery and electrolyte package embodying a sealed chamber containing the battery and a vessel containing its electrolyte, the parts being so designed that the electrolyte vessel may be caused to release the electrolyte into the chamber, and the filling operation carried out wholly within the package and without the necessity of the operator handling the electrolyte or manipulating valves or other apparatus.

A further object is to provide a novel method of filling batteries and the like in which the battery and a separate sealed vessel containing the electrolyte are introduced into a chamber which is then evacuated and sealed, and the vessel and battery are so associated with each other in the chamber that the electrolyte may be freed from its vessel and introduced into the battery without opening the chamber.

Further objects will become apparent as the specification proceeds in conjunction with the annexed drawings, and from the appended claims.

Figure 2:
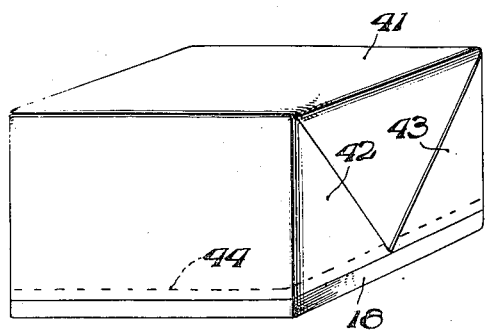

In the drawing,

Figure 1 is a vertical sectional view through the battery package of the invention with the battery and electrolyte receptacle broken away, to more clearly illustrate the structure, and Figure 2 is a perspective view of the battery.

With continued reference to the drawing, in which like reference characters have been employed to designate similar parts, the package unit is made up of a sheet metal container having a side wall 11 and top and bottom headers 12 and 13 respectively. Bottom header 13 is secured to side wall 11 in any suitable manner, as for instance, by flanging and soldering in accordance with well known container-forming practices. If desired, however, the header may be secured in place by crimping it into sealing engagement with the side wall, in the manner also well understood in the art.

Top header 12 is secured to side wall 11 in similar manner, and is provided with a cup shaped formation 15 embodying a restricted nozzle 16 which is utilized to evacuate the container and to seal it off, as by means of soldering and crimping after the chamber has been evacuated. Top header 12 is also provided with a corrugated portion 17 for the purpose of rendering the top wall sufficiently flexible to permit the electrolyte vessel to be fractured or broken in response to an externally applied blow.

Prior to assembly of top header 12 with its side wall, the battery 18, the electrolyte vessel, and the frame structure to be later described, are inserted. Battery 18 is of well known construction embodying a plastic or other suitable body 21 having a plurality of electrolyte cell-forming bores or cavities 22 therein and may, for example, take the form of the battery shown in U. S. Patent 2,306,935, issuing to L. D. Cahill et al. The battery has a bottom 23 which is provided with a plurality of capillary-like openings 24 communicating with each of the cells, it being understood that the passages are of such small diameter that simple immersion of the battery in a body of electrolyte would be inoperative to introduce electrolyte into the cells.

Each cell contains a pair of electrodes 25 and 26 which form the positive and negative poles of the battery, as is well understood in the art, and they are sealed into a plastic or other suitable battery closure 27, and are connected to battery leads (not shown). The battery is supported with its bottom disposed in spaced relationship to container bottom 13 by means of lugs 28 carried by the two legs 29 of a frame structure 31. Legs 29 seat directly against container bottom 13. The battery filling passages are accordingly maintained out of contact with bottom 13.

The frame structure has an upper surface 32, upon which seats an electrolyte vessel 33 containing a body of electrolyte 34, and having a slight expansion space 35 to take care of thermal expansion and contraction. The vessel preferably takes the form of a glass or other breakable bottle, which is preferably filled, evacuated of air, and then sealed off at 36, in well known manner. The bottle is restrained against inadvertent displacement with respect to the frame structure by means of pairs of lugs 37 and 38, which engage the sides of the bottle and a lug 39 which cooperates with the end of the bottle to prevent it from shifting endwise a sufficient distance to bring its sealing tip 36 into engagement with the container side wall.

From the foregoing it is apparent that when flexible endwall portion 17 is given a blow with a hammer or other suitable object, bottle 33 will be broken, and the electrolyte will gravitate around the battery into the lower portion of the container in submerging relationship with the mouths of the capillary passages. It is preferable to break the entire bottle rather than merely break off tip 36, as the latter would result in a large quantity of electrolyte remaining in the bottle.

In order to prevent the electrolyte from coming into contact with the battery terminals and the other walls of the battery, I preferably provide the battery with a liquid-proof paper or "cellophane" envelope 41, which, as seen more clearly in Figure 2, fits over the top and the four adjoining side walls of the battery, and is provided with folds 42 and 43 at its ends. The envelope is preferably secured to the four side walls in the region designated 44 by any suitable adhesive, so that after the battery has been filled and the assembly inverted, the electrolyte adhering to wall 23 of the battery will not run down the sides thereof.

Accordingly, the foregoing battery filling operation may be completed, subsequent to breaking the electrolyte bottle, by allowing atmospheric pressure to act upon the level of the electrolyte in the bottom of the container. This is preferably brought about by snipping off the end of sealing tube 16. However, if desired, individual bleed openings may be made in the top wall 12, as, for instance, by means of an ice pick or the like. Upon application of atmospheric pressure to the body of electrolyte, it is apparent that it will force the electrolyte upwardly through passages 24 into cells 22.

After the battery has been filled in the manner just described, the container is opened in any suitable manner, and the battery removed. This is preferably carried out by providing side wall 11 with a weakened zone adjacent bottom wall 13 and associating with it a key 45 connected to the free end or tab 46 of the scored strip, for opening the container along the weakened zone, in the manner of a scored sheet metal container, as is well understood in the container art.

The container is preferably inverted prior to the opening operation, and after the end of the container has been removed, legs 29 are grasped and the frame structure lifted upwardly sufficiently to permit the battery to be grasped and removed. Upon removal of the battery in the manner just discussed, a knife or other tool is run around the edge of the battery to release envelope 41 from its zone of securement 44, it being observed that the envelope prevents the terminals and other parts of the battery from being exposed to the electrolyte, and that upon removal of the envelope the battery is ready to be placed into use.

The interior of the container is preferably coated with an acid-resistant film, for the purpose of protecting it against attack by the acid, and contamination of the latter by ferrous or ferric salts and oxides.

From the foregoing detailed disclosure it is apparent that the invention provides a novel method of, and apparatus for packaging storage batteries and the like as a unitary assembly, which may readily be manipulated by the user to properly fill the battery at the place and time of use, thereby obviating the necessity of providing the user with pumps and other equipment for filling batteries, and at the same time minimizing the handling of electrolyte by the user.

It is to be understood that while I have disclosed a method as applied to the filling of storage batteries, and it is particularly advantageous when so applied, it may be successfully employed for the packaging and filling of other hollow bodies, especially those having capillary or other passages which prevent them from being filled by conventional immersion methods, and the appended claims are intended to embrace the invention when it is applied to such uses. Also, the container disclosed is of generally rectangular form, but it is to be understood that it may assume other forms, depending upon the shape of the battery and electrolyte receptacle, without departing from the spirit of the invention.

The frame structure 31 is employed primarily for the purpose of avoiding damage to the battery when bottle 33 is fractured, and it is to be understood that it is not necessary to locate the bottle vertically over the battery, and that when the bottle and battery are disposed in side-by-side relationship the frame structure may be simplified so as to merely be relied upon to prevent inadvertent shifting of the bottle or may be omitted and other means relied upon to prevent shifting of the bottle, and the appended claims are intended to embrace the invention when it assumes such form.

It is to be understood that the material of container body 11 and headers 12 and 13 will be of sufficiently heavy gage to resist collapse in response to atmospheric pressure, but if desired it may be made of comparatively thin material and reenforced or stiffened by suitable corrugations or ribs, as is well understood in the container and sheet metal working arts, or if desired frame 31 may be designed to effect the desired internal reenforcement. Also, if desired, corrugated portion 17 may be used as a pressure indicating element, in view of the fact that atmospheric pressure will depress it to various extents, depending upon the degree of evacuation. For instance, any suitable means, such as a straight edge placed across the edge of header 12, may be employed to measure the depression or downward deflection of portion 17 in response to evacuation. Accordingly, the package units may be tested at the factory prior to shipment, or prior to use, to determine whether the container has been properly evacuated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In a combined package and filling device for hollow bodies; a substantially evacuated hollow chamber; a closed, breakable liquid-containing vessel in the upper portion of said chamber; a hollow body in the lower portion of said chamber adapted to be filled with said liquid, said body having a plurality of downwardly directed filling openings; said chamber having a wall adjacent said vessel which is sufficiently flexible to enable said vessel to be broken by an external blow against said wall, whereby said liquid will discharge and find a level in the lower portion of said chamber; and normally sealed means for subsequently admitting atmospheric air to said chamber above the liquid level therein, whereby atmospheric pressure will force said liquid upwardly into said hollow body through said filling openings.

2. A unitary battery package assembly comprising a sealed, evacuated chamber containing a breakable liquid-filled vessel and a hollow body having filling openings through which liquid may be fed to its interior, said chamber having a wall adjacent said vessel which may be flexed inwardly into fracturing relationship to said vessel by means of an externally applied blow, whereby the released liquid will gravitate to the lower portion of said chamber covering said filling openings; and means for subsequently applying atmospheric pressure to the level of said liquid, for forcing liquid into said hollow body via said filling openings.

3. The battery package defined in claim 2, wherein said last-named means comprises normally impervious means for venting air into said sealed chamber.

4. In a unitary device for storing and filling hollow bodies with liquid, a sealed chamber which is substantially evacuated of air; a sealed, liquid-containing vessel disposed in said chamber; a hollow body disposed in said chamber in cooperative relationship to said vessel and adapted to be filled with the liquid contained therein; means for releasing the liquid from said vessel so that it may gravitate into the lower portion of said chamber; said body having filling openings located below the liquid level in said chamber; and normally sealed means for connecting the interior of said chamber to the surrounding atmosphere, for forcing said liquid through said filling openings into said hollow body.

5. The device defined in claim 4, wherein said liquid containing vessel and said hollow body are disposed in substantially vertically superposed relationship, with the latter below the former, whereby upon release of liquid from said vessel it will gravitate into immersing relationship with the lower portion of said hollow body.

6. The device defined in claim 4, wherein said vessel is located above said hollow body, and the latter is of such cross-sectional area as to substantially fill the lower portion of said chamber.

7. In the art of filling multiple-cavitied bodies having capillary-like passages leading from the cavities to the exterior of the body, the method of filling said cavities with liquid, which comprises the steps of inserting said body and a separate body of liquid into a chamber; substantially evacuating said chamber and said body of air; sealing said chamber; releasing said body of liquid into said chamber to a depth sufficient to submerge the passages of said body; and then venting the interior of said chamber to the atmosphere, for forcing said liquid into said cavities.

8. In the art of filling multiple-cavitied bodies having capillary-like passages leading from the cavities to the exterior of the body, the method of filling said cavities with liquid, which comprises the steps of inserting said body in a chamber, with the mouths of said passages facing downwardly; substantially evacuating said chamber and said body of air; sealing said chamber; releasing a body of liquid into said chamber to a depth sufficient to cover the mouths of the passages of said body to a substantial depth while maintaining the hermetic seal of said chamber; and then applying atmospheric pressure to the surface of said liquid, for forcing said liquid upwardly through said passages into said cavities.

9. In the art of filling multiple-cavitied bodies having capillary-like passages leading from the cavities to the exterior of the body, the method of filling said cavities with liquid, which comprises the steps of inserting said body in a chamber; introducing a sealed vessel into said chamber containing a body of liquids; substantially evacuating said chamber and said body of air; hermetically sealing said chamber; releasing a body of liquid from said sealed vessel into said chamber to a depth sufficient to cover the passages of said body; and then venting the interior of said chamber to the surrounding atmosphere, for forcing said liquid into said cavities.

10. In a combined package and filling device for hollow bodies; a substantially evacuated hollow chamber; a closed, breakable liquid-containing vessel in a first portion of said chamber; a hollow body in a second portion of said chamber adapted to be filled with said liquid, said body having a plurality of filling openings directed away from said first portion of said chamber; said chamber having a wall adjacent said vessel which is sufficiently flexible to enable said vessel to be broken by an external blow against said wall without rupture of said wall, whereby said liquid is released from said vessel to flow about said filling openings, and means for admitting atmospheric air to said first portion of said chamber, whereby atmospheric pressure will force said liquid upwardly into said hollow body through said filling openings.

VERNON D. HAUCK.

REFERENCES CITED

The following references are of record in the file of this patent:

UNITED STATES PATENTS

| Number | Name | Date |
|---|---|---|
| 932,841 | Andrews | Aug. 31, 1909 |
| 1,259,485 | Byrne | Mar. 19, 1918 |
| 2,147,116 | Winckler | Feb. 14, 1939 |
| 2,306,935 | Cahill et al. | Dec. 29, 1942 |
| 2,382,675 | Sutherland et al. | Aug. 14, 1945 |

FOREIGN PATENTS

| Number | Country | Date |
|---|---|---|
| 289,324 | Great Britain | Apr. 26, 1928 |

OTHER REFERENCES

Williard: "Automotive Industries," Aug. 1, 1944—page 40.